United States Patent [19]
Maupin et al.

[11] Patent Number: 5,953,663
[45] Date of Patent: Sep. 14, 1999

[54] REROUTING AN INCOMING CALL TO A PORTED TELECOMMUNICATIONS TERMINAL

[75] Inventors: Alain Maupin, Richardson; James L. Mills, Jr., Plano, both of Tex.

[73] Assignee: Ericsson Inc., Research Triangle Park, N.C.

[21] Appl. No.: 08/719,562

[22] Filed: Sep. 25, 1996

[51] Int. Cl.$^6$ ............................ H04Q 7/24; H04M 3/42
[52] U.S. Cl. ........................ 455/433; 455/445; 379/207
[58] Field of Search ................................. 455/432, 433, 455/436, 445, 414, 417, 438, 439, 461; 379/196, 207, 258, 308, 309, 201, 243

[56] References Cited

U.S. PATENT DOCUMENTS

| | | | |
|---|---|---|---|
| 4,310,727 | 1/1982 | Lawser | 379/207 |
| 4,754,479 | 6/1988 | Bicknell et al. | 379/207 |
| 5,226,075 | 7/1993 | Funk et al. | 379/201 |
| 5,237,604 | 8/1993 | Ryan | 379/220 |
| 5,247,571 | 9/1993 | Kay et al. | 379/207 |
| 5,251,248 | 10/1993 | Tokunaga et al. | 455/461 |
| 5,400,390 | 3/1995 | Salin | 455/433 |
| 5,422,941 | 6/1995 | Hasenauer et al. | 379/207 |
| 5,423,068 | 6/1995 | Hecker | 455/438 |
| 5,436,957 | 7/1995 | McConnell | 379/207 |
| 5,442,683 | 8/1995 | Hoogeveen | 455/403 |
| 5,455,855 | 10/1995 | Hokari | 379/229 |
| 5,457,736 | 10/1995 | Cain et al. | 455/439 |
| 5,465,295 | 11/1995 | Furman | 379/207 |
| 5,481,603 | 1/1996 | Gutierrez et al. | 379/201 |
| 5,504,804 | 4/1996 | Widmark et al. | 455/414 |
| 5,623,541 | 4/1997 | Boyle et al. | 379/207 |
| 5,839,072 | 11/1998 | Chien | 455/445 |

FOREIGN PATENT DOCUMENTS

WO 96/11557   4/1996   WIPO .

OTHER PUBLICATIONS

Beller, "Call Delivery to Portable Telephones Away from Home Using the Local Exchange Network", IEEE International Conference on Communications, Denver, Jun. 23, 1991, pp. 948–953.

Giordano, et al., "PCS Number Portability", IEEE International Symposium on Personal Indoor and Mobile Radio Communications, Sep. 18, 1994, pp. 1146–1150.

PCT Search Report dated Mar. 9, 1998 for application No. PCT/US 97/17053.

Generic Switching and Signaling Requirements for Number Portability J.J. Lichter, AT&T Network Systems, Generic Requirements, Issue 1.00 Feb. 2, 1996—pp. 1–75.

Primary Examiner—Willis R. Wolfe
Attorney, Agent, or Firm—Jenkens & Gilchrist, P.C.

[57] ABSTRACT

An incoming call towards a ported telecommunications terminal is routed to the donor telecommunications node associated with the dialed directory number without first performing a number portability database (NP-DB) query. Upon determining that the telecommunications terminal associated with the specified called party directory number has been ported, a signal querying the NP-DB is transmitted by the donor node. In response, the NP-DB provides a network address representing the gaining telecommunications node to the next-to-last (N-1) switch. Utilizing the received network address, the N-1 switch releases the first call connection with the donor telecommunications node and reroutes the call connection to the gaining telecommunications node associated with the received network address.

8 Claims, 6 Drawing Sheets

REROUTING AN INCOMING CALL TO A PORTED TELECOMMUNICATIONS TERMINAL

CROSS REFERENCE TO RELATED APPLICATION

This application is related to U.S. application for patent Ser. No. 08/657,403, filed Jun. 3, 1996, entitled "Downloading of Routing Numbers To Donor Switches Within A Telecommunications Network", now U.S. Pat. No. 5,890,063, which is hereby incorporated by reference herein.

BACKGROUND OF THE INVENTION

1. Technical Field of the Invention

The present invention relates to a telecommunications network and, in particular, to the rerouting of incoming calls to a ported telecommunications terminal within a telecommunications network.

2. Description of Related Art

Each telecommunications terminal associated with a particular telecommunications network is assigned a unique identification number for receiving an incoming call. Within the Global System for Mobile (GSM) communications or the Personal Communications System (PCS), each mobile station is assigned a unique identification number known as a Mobile Station Integrated Services Digital Network (MSISDN) number. Similarly, each wireline telecommunications terminal connected to a particular Public Switched Telephone Network (PSTN) is assigned a unique directory number. Such an MSISDN or directory number is dialed whenever a caller wants to communicate with a particular telecommunications terminal. The telecommunications network determines, by analyzing a part of the dialed number, the home PSTN or Public Land Mobile Network (PLMN) associated with the called party terminal and accordingly routes the call to the destination telecommunications node serving the called party terminal.

Telecommunications subscribers often relocate from a first service area served by a first telecommunications service provider to a second service area served by a second telecommunications service provider as they relocate from one city to another or one geographic area to another. By relocating, a particular subscriber's pre-existing subscriber agreement with the first telecommunications service provider is terminated and a new subscription agreement with the second telecommunications service provider must be established. However, a specific series of MSISDN or directory numbers are pre-assigned to each telecommunications service provider, or more particularly, each telecommunications node (e.g., local exchange or home location register) within an associated PLMN or PSTN. Therefore, by relocating from one telecommunications network to another, the telecommunications subscriber or associated terminal accordingly must be assigned a new MSISDN or directory number within the series pre-assigned to the new second telecommunications service provider. Changing the assigned MSISDN or directory number is a cumbersome process in part because the telecommunications user must inconveniently notify all relevant parties of his new MSISDN or directory number.

American Telephone & Telegraph (AT&T) has proposed the concept of the use of a location routing number (LRN) to alleviate some of the analogous problems associated with wireline terminals of subscribers who move from one region or network to another without changing their directory numbers. In accordance with the LRN concept, a centralized database storing a network address representing the end office currently serving the wireline terminal is queried by a tandem switch or a service switching point (SSP) within a Public Switched Telephone Network (PSTN) to route an incoming call to the correct end office.

A U.S. application for patent Ser. No. 08/656,723, entitled "Routing An Incoming Call To A Ported Mobile Station Within A Telecommunications Network", filed by Gun-Shin Chien on Jun. 3, 1996 (hereinafter referred to as the Chien application), now U.S. Pat. No. 5,839,072, which is hereby incorporated by reference herein, further discloses a system and method for maintaining a centralized database for storing data correlating a particular MSISDN with a network address representing the home Public Land Mobile Network (PLMN) and, more particularly, the home location register (HLR) within that particular PLMN currently serving the ported mobile station rather than the HLR or PLMN to which that number was originally assigned. Accordingly, when the centralized database is queried, the network address representing the current HLR serving the ported mobile station is returned.

Even though the Chien application and the LRN concept enable the routing of an incoming call to a ported telecommunications terminal (e.g., wireline terminal and mobile station) within a telecommunications network, there are certain system characteristics which are not optimal for certain applications.

The telecommunications network cannot determine whether the called party telecommunications terminal has been ported just by analyzing the received MSISDN or directory number. In instances when only one number within a given series is ported out of a particular PLMN or PSTN, all incoming calls intended for that particular PLMN or PSTN have to be inefficiently queried to the centralized database. As an illustration, out of the 214-555-XXXX series, even if only one number is ported, incoming calls for each and every one of the 214-555-XXXX number series have to be queried to the centralized database.

Such an exhaustive querying mechanism is both inefficient and wasteful. Accordingly, there is a need for a mechanism to reduce the number of queries performed to the centralized database to reroute incoming signals to the current PLMN or PSTN serving a ported telecommunications terminal.

SUMMARY OF THE INVENTION

A first telecommunications node within a telecommunications network receives a call setup signal towards a telecommunications terminal assigned a particular directory number. The first telecommunications node includes an originating switch connected to a calling party telecommunications terminal and a signal switching point (SSP) or a tandem switch. By analyzing the received directory number, the first telecommunications node routes the received incoming call to a second telecommunications node associated with the analyzed directory number. In response to the received call setup signal, the second telecommunications node determines that the called party telecommunications terminal has been ported to another node. A connection-less signal from the second telecommunications node to a centralized database storing a network address representing a new third telecommunications node serving the ported telecommunications terminal is transmitted. The transmitted signal requests the centralized database to provide the network address to the first telecommunications node. In response to a receipt of the network address from the centralized database, the first telecommunications node then reroutes the received incoming call to the third telecommunications node currently serving the ported telecommunications terminal.

In one embodiment, the telecommunications terminal is a wireline subscriber terminal that has been ported from a first wireline local exchange to a second wireline local exchange. In another embodiment, the telecommunications terminal is a mobile station that has been ported from a first home location register (HLR) to a second HLR.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
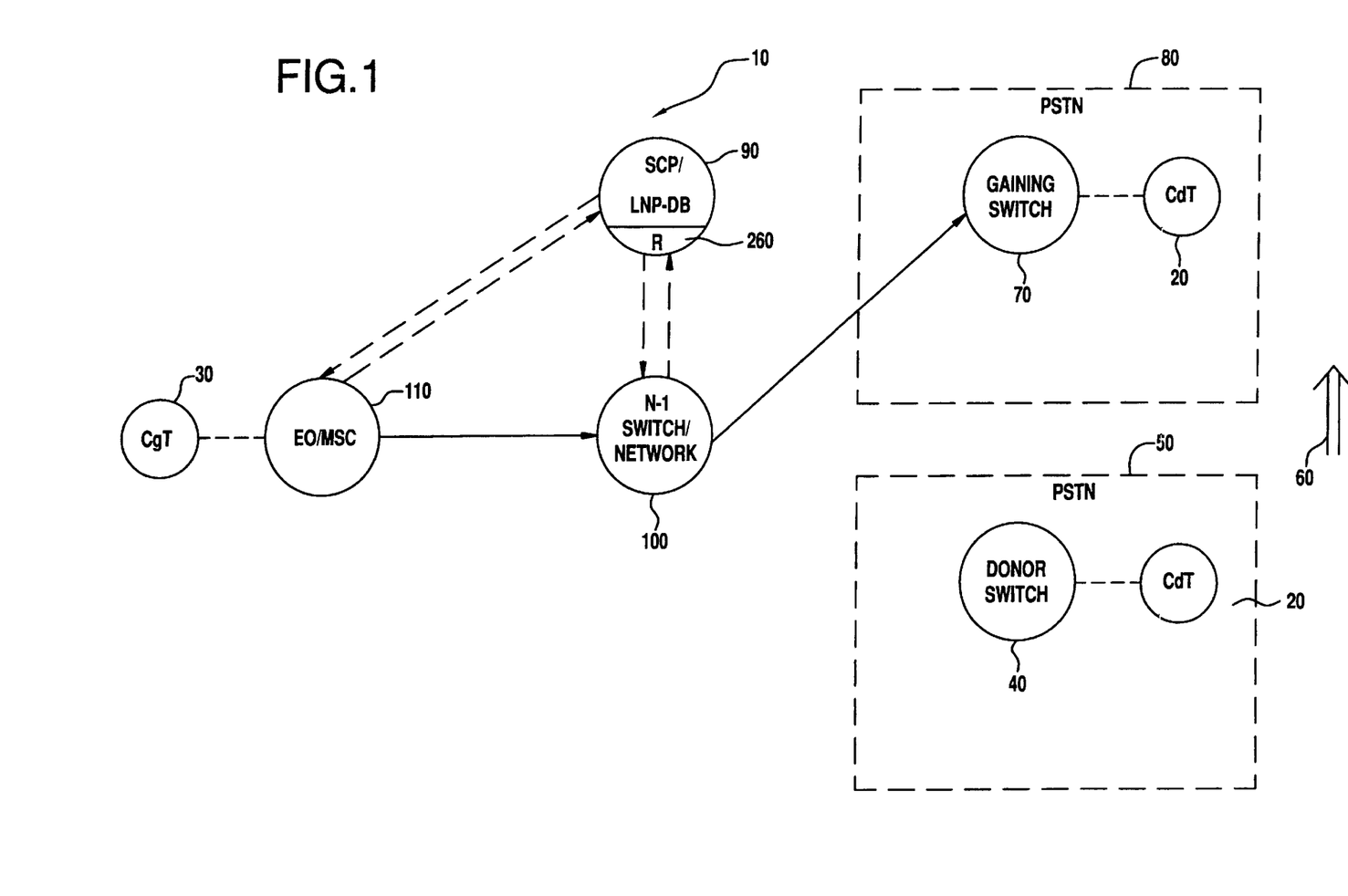
FIG. 1 is a block diagram of a telecommunications network illustrating the routing of an incoming call to a ported wireline subscriber terminal.

FIG. 1 is a block diagram of a telecommunications network 10 illustrating the routing of an incoming call to a ported wireline subscriber 20. Conventionally, all incoming calls from a calling party wireline subscriber terminal or calling party mobile station, hereinafter the calling party terminal (CgT) 30, are routed to the first wireline telecommunications node 40 because the dialed directory number associated with the called wireline subscriber terminal indicates which telecommunications node 40 within the first PSTN 50 is associated with the called party. However, in accordance with the concept of number portability and as illustrated by the relocation 60 of a subscriber, the subscriber terminates his subscription agreement with the existing first telecommunications node 40 and registers with the second telecommunications node 70 within the new PSTN 80 without changing his directory number. Because the directory number has not been updated to correctly reflect the new telecommunications node 70 serving the ported wireline subscriber terminal 20, all future incoming calls are still routed to the old PSTN 50 to which that directory number is originally assigned.

Accordingly, in order to properly reroute incoming calls to the second telecommunications node 60 within the second PSTN 80, a centralized database 90, with a memory register 260 storing a network address representing the local switch currently serving the ported wireline terminal 20, is queried by the next to last signal network or node (N-1) 100 in the call path. A tandem switch or service switching point (SSP) within the next to last (N-1) network or node may perform the query to route the call. As an alternative, an originating telecommunications node 110 serving the calling party terminal 30 may further directly query the centralized database 90 to determine the network address of the serving telecommunications node 70. In case the originating telecommunications node 110 is not query capable, using a conventional routing mechanism, the call setup signal is routed towards the first telecommunications node 40 as specified by the dialed directory number representing the wireline terminal 20. When the call setup signal is received by a query capable SSP or tandem switch 100, the SSP or the tandem switch 100 performs a database query to the centralized database 90. Such a centralized database 90 is known as a number portability database (NP-DB) and may include a service control point (SCP) within an Intelligent Network (IN). The centralized database stores correlation data correlating each ported directory number with a network address representing the new wireline telecommunications node serving the ported terminal. As a result, the network address representing the second telecommunications node 70 currently serving the ported wireline subscriber terminal 20 is provided to the querying telecommunications node 100. Utilizing the provided network address, the querying telecommunications node routes the call setup signal directly to the new telecommunications node 70 serving the ported wireline terminal 20. As an illustration, the SSP or the tandem switch 100 uses the retrieved network address as the new Called Party Number (CdPn) in the transmitted call setup signal, such as an Initial Address Message (IAM), over a Signaling System No. 7 (SS7) telecommunications network. The originally dialed directory number representing the wireline terminal 20 is also included into a Generic Address Parameter (GAP) within the IAM signal to "piggy-back" to the serving telecommunications node. Since the CdPn now points to the second telecommunications node 70, the IAM signal is rerouted to the second telecommunications node 70 instead of to the first telecommunications node 40 as indicated by the dialed directory number. Once the IAM signal is received by the second telecommunications node 70, the encapsulated directory number representing the ported wireline subscriber terminal 20 is extracted from the GAP, the physical location of the wireline terminal 20 is determined by indexing its line module (LM), and a call connection is established with the ported wireline subscriber terminal.

Figure 2:
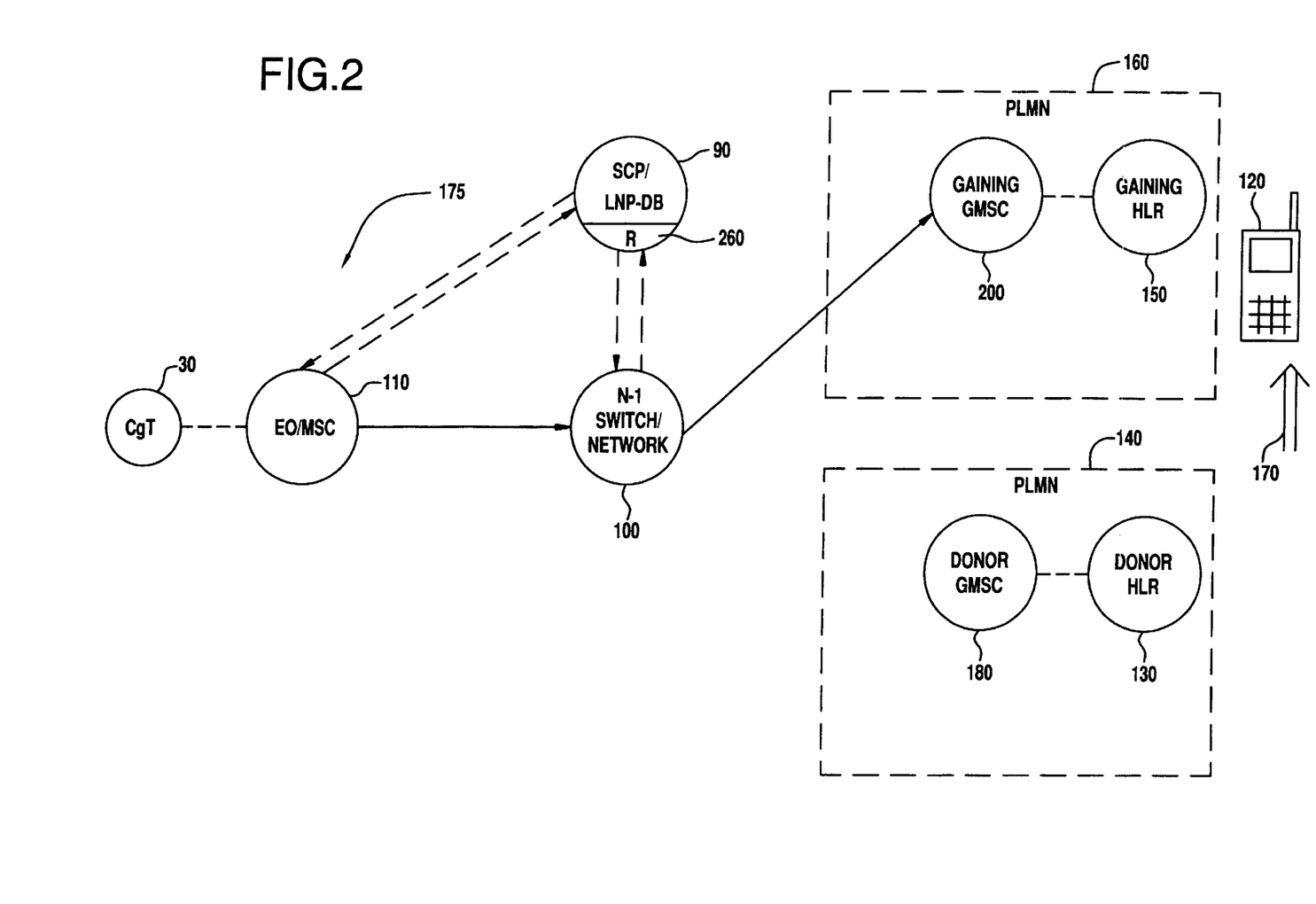
FIG. 2 is a block diagram of a telecommunications network illustrating the routing of an incoming call to a ported mobile station.

Reference is now made to FIG. 2 where a mobile station 120 associated with a first home location register (HLR) 130 within a first Public Land Mobile Network (PLMN) 140 is shown relocating or porting to a second HLR 150 within a second PLMN 160 (inter-PLMN number portability 170). The mobile station 120 is initially registered with the first PLMN 140 as the home PLMN.

Conventionally, all incoming calls either from the PSTN 175 or another PLMN are received by the first gateway mobile switching center (GMSC) 180 within the first PLMN 140 and accordingly routed to the serving MSC (not shown in FIG. 2) by interrogating the assigned first HLR 130. The first GMSC 180 properly routes an incoming call to the serving MSC (not shown in FIG. 2) because the dialed Mobile Subscriber Integrated Service Digital Network (MSISDN) number includes a value indicative of which HLR within the home PLMN 140 is storing the requisite subscriber information related to the called party mobile station 120. Consequently, the first GMSC 180 analyzes the received MSISDN number, determines the appropriate HLR 130, requests routing instruction from the determined HLR 130, and then routes the incoming call to the appropriate MSC.

Again, in accordance with the concept of number portability and as illustrated by the relocation 170, the mobile station 120 terminates his subscription agreement with the existing HLR 130 (donor HLR) and registers with the new HLR 150 (gaining HLR) within the new PLMN 160 (gaining PLMN) without changing his MSISDN number. However, because the MSISDN number has not been updated in the mobile station 120 to reflect the new HLR 150 (gaining HLR) and the new PLMN 160 (gaining PLMN), all future incoming calls are still routed to the old PLMN 140 (donor PLMN). The donor GMSC 180 within the donor PLMN 140 is not able to reroute the received incoming calls to the relocated mobile station 120 because the first GMSC 180 (donor GMSC) is no longer able to determine the correct HLR storing the subscriber information by merely analyzing the received MSISDN number.

In a manner similar to the routing of an incoming call to a ported wireline subscriber terminal shown in FIG. 1, the centralized database 90 with the memory register 260 storing a network address representing the gaining GMSC 200, and more particularly the gaining HLR 150, is queried by the next to last signal network or node 100 in the call path. Alternatively, the originating switch 110 associated with the calling party subscriber terminal 30 may directly query the centralized database 90 to retrieve the network address representing the gaining GMSC 200 and HLR 150. In case the originating switch 110 is not query capable, using a conventional routing mechanism, the call setup signal is routed towards the donor GMSC 180 serving the donor PLMN 140 as specified by the dialed MSISDN number associated with the ported mobile station 120. When the call setup signal is received by a query capable SSP or tandem switch 100, the SSP or tandem switch 100 performs a database query to the centralized database 90. In response to the query request, the centralized database 90 returns a network address representing the gaining GMSC 200 or HLR 150 currently serving the ported mobile station 120 to the requesting node 100. The SSP then uses the retrieved network address as the new Called Party Number (CdPn) in the transmitted call setup signal, such as an Initial Address Message (IAM). The originally dialed MSISDN number representing the ported mobile station 120 is also included into a Generic Address Parameter (GAP) within the IAM signal to "piggy-back" to the gaining GMSC 200. Since the CdPn points to the gaining GMSC, the IAM signal is routed to the gaining GMSC 200 instead of to the donor GMSC 180. Upon receiving the call setup signal, the gaining GMSC 200 extracts the included MSISDN number from the GAP parameter, determines the gaining HLR 150 currently serving the ported mobile station 120, and requests routing instruction from the appropriate MSC (not shown in FIG. 2) currently serving the ported mobile station 120 to reroute the received call setup signal to the serving MSC.

Even though the above centralized database 90 enables the routing of an incoming call to a ported telecommunications terminal (e.g., wireline terminal and mobile station) within a telecommunications network, there are certain system characteristics which are not optimal for certain applications.

The telecommunications network cannot determine whether the called party telecommunications terminal (i.e., wireless and wireline terminal) has been ported or not just by analyzing the received MSISDN or directory number. In instances where only one number is ported out of a particular PLMN or PSTN, all incoming calls intended for that particular PLMN or PSTN have to be inefficiently queried by the centralized database. As an illustration, out of the 214-555-XXXX series, even if only one number is ported, incoming calls for each and every one of the 214-555-XXXX number series have to be queried by the centralized database. This is true even if a call is originated by a mobile station within the donor PLMN. Such exhaustive querying mechanism is both inefficient and wasteful.

Figure 3:
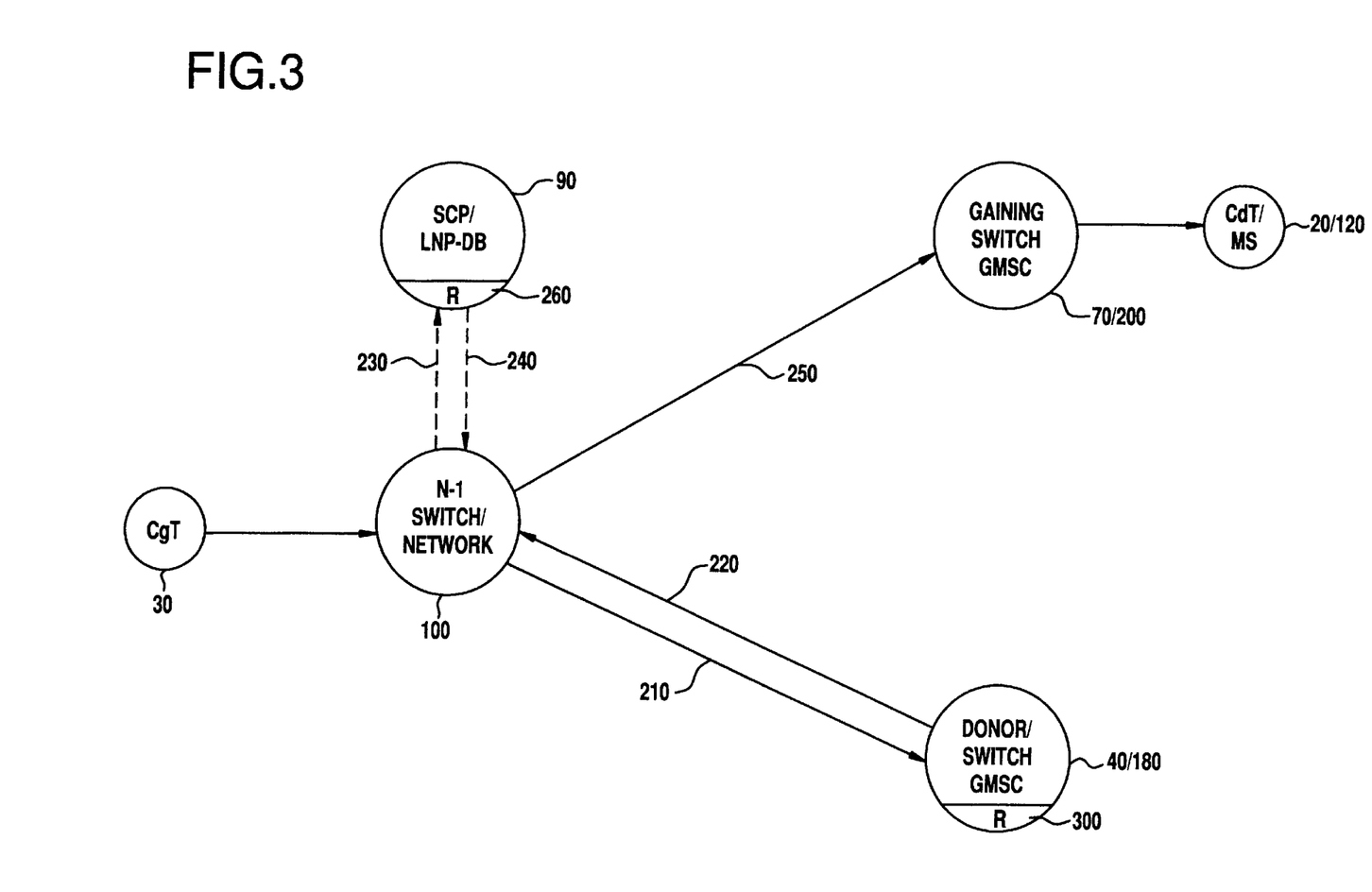
FIG. 3 is a block diagram of a telecommunications network illustrating the routing of an incoming call to a ported telecommunications terminal using a query reduction scheme.

In order to eliminate the exhaustive querying to the centralized database, a number of different query reduction schemes have been introduced by several telecommunications service providers and vendors. One such query reduction scheme is "query on release" as illustrated by FIG. 3. The calling party subscriber terminal 30 (e.g., wireline subscriber terminal or mobile station) requests a call connection towards a particular called party telecommunications terminal using the assigned directory or MSISDN number as the called party number. The call setup signal is originated by the originating telecommunications switch (not shown in FIG. 3) connected to the calling party subscriber terminal 30 and, in turn, received by the N-1 network or switch 100. Such N-1 switch 100 may include a SSP or tandem switch. Without performing any database query, the incoming call connection is routed to the home PLMN or PSTN indicated by the received MSISDN or directory number (signal 210). In case the called party subscriber terminal is a wireline terminal, a donor local switch 40 assigned to the dialed called party subscriber terminal receives the call setup signal, such as the IAM, and determines that the number has been ported. For example, the donor local switch 40 may make such a determination by ascertaining that there is no line connection to the assigned directory number. Alternatively, there may be a register 300 within the donor local switch 40 indicating that the subscriber associated with the received directory number has been ported. In response to such a determination, another Integrated Service Digital Network User Part (ISUP) based signal 220 requesting the N-1 switch 100 to release the first call connection established as a result of the first call setup signal is transmitted from the donor local switch 40. The transmitted ISUP signal 220, such as Release, further contains data indicating that the called party number has been ported and the N-1 switch should perform a database query to determine the new gaining local switch. As a result, the N-1 switch 100 transmits a database query signal, such as an Intelligent Network (IN) based signal or any other Signaling Control Connection Part (SCCP) based signal 230, to the centralized database 90. The centralized database 90 retrieves the network address representing the gaining node within the gaining PLMN or PSTN from the register 260 and returns the retrieved network address to the requesting N-1 switch (signal 240). In case the called party subscriber terminal has been ported to a wireline terminal, the retrieved network address represents the gaining local switch 70 within the gaining PSTN. On the other hand, if the called party subscriber terminal has been ported to a mobile station, the network address represents the gaining GMSC 200, or more particularly the gaining HLR (not shown in FIG. 3), within the gaining PLMN.

After the network address representing the gaining telecommunications node is received by the N-1 switch 100, the received call setup signal 250 is rerouted to the gaining telecommunications node 70/200 using the received network address as the new CdPn. The original MSISDN or directory number associated with the called party subscriber terminal 20/120 is further included in the GAP within the new IAM signal in a conventional manner. As a result, a new call connection to the gaining PLMN or PSTN is established enabling the calling party subscriber terminal 30 to communicate with the ported called party subscriber terminal 20/120.

Even though the above "query on release" mechanism enables the N-1 switch 100 to query the centralized database 90 for only the ported directory or MSISDN numbers, there are certain undesirable system characteristics. First of all, the ISUP Release signal must be modified to include a new parameter for indicating that the number has been ported. As a result, appropriate standardization and governing bodies, such as American National Standards Institute (ANSI) or International Telecommunications Union (ITU), must review and approve the changes to the signal protocol. The N-1 switch must further wait for a Release signal from the donor node 40/180 and then query the centralized database 90 for a new network address.

Figure 4:
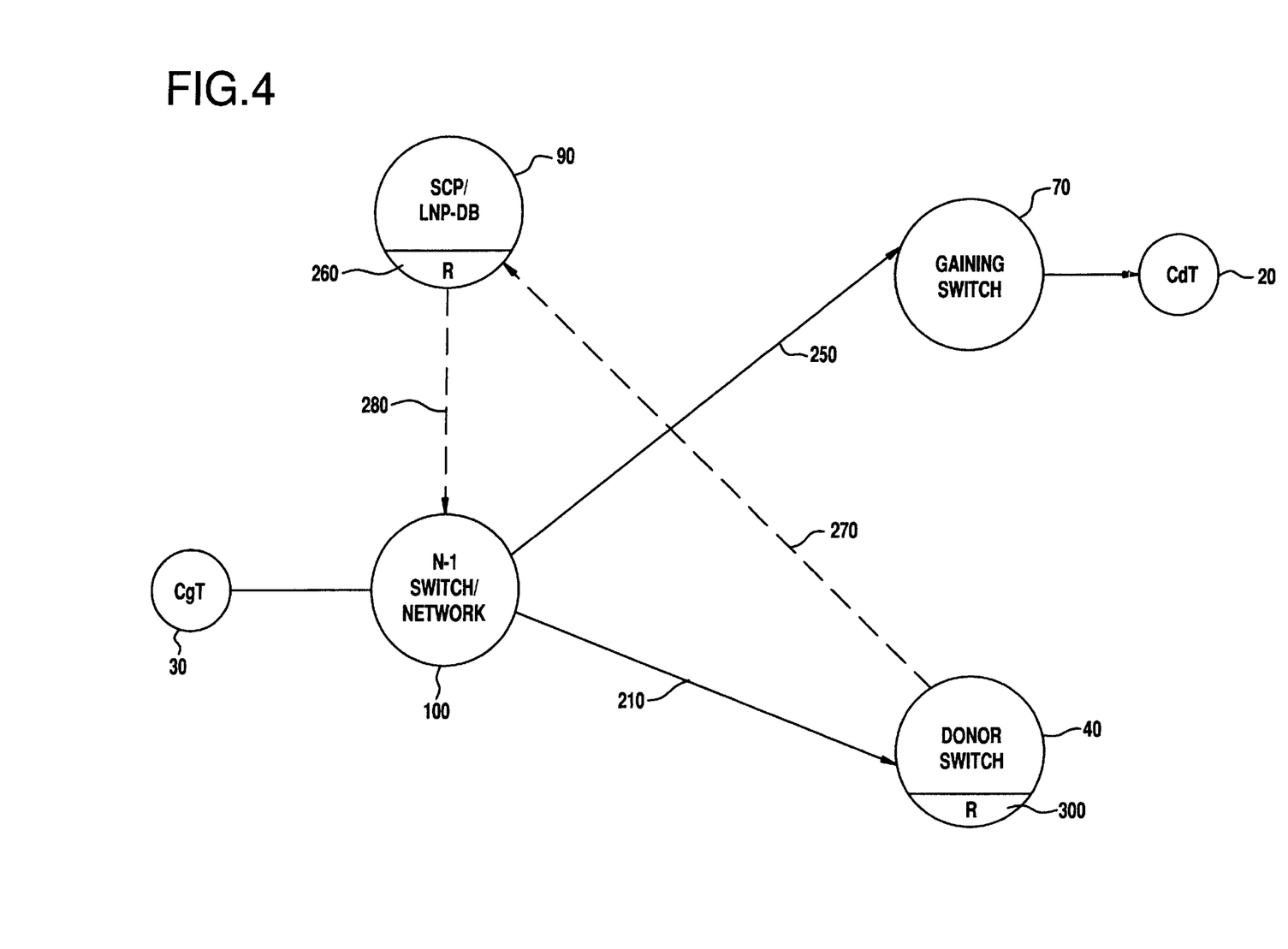
FIG. 4 is a block diagram of a telecommunications network illustrating the routing of an incoming call to a ported wireline subscriber terminal in accordance with the teachings of the present invention.
Figure 5:
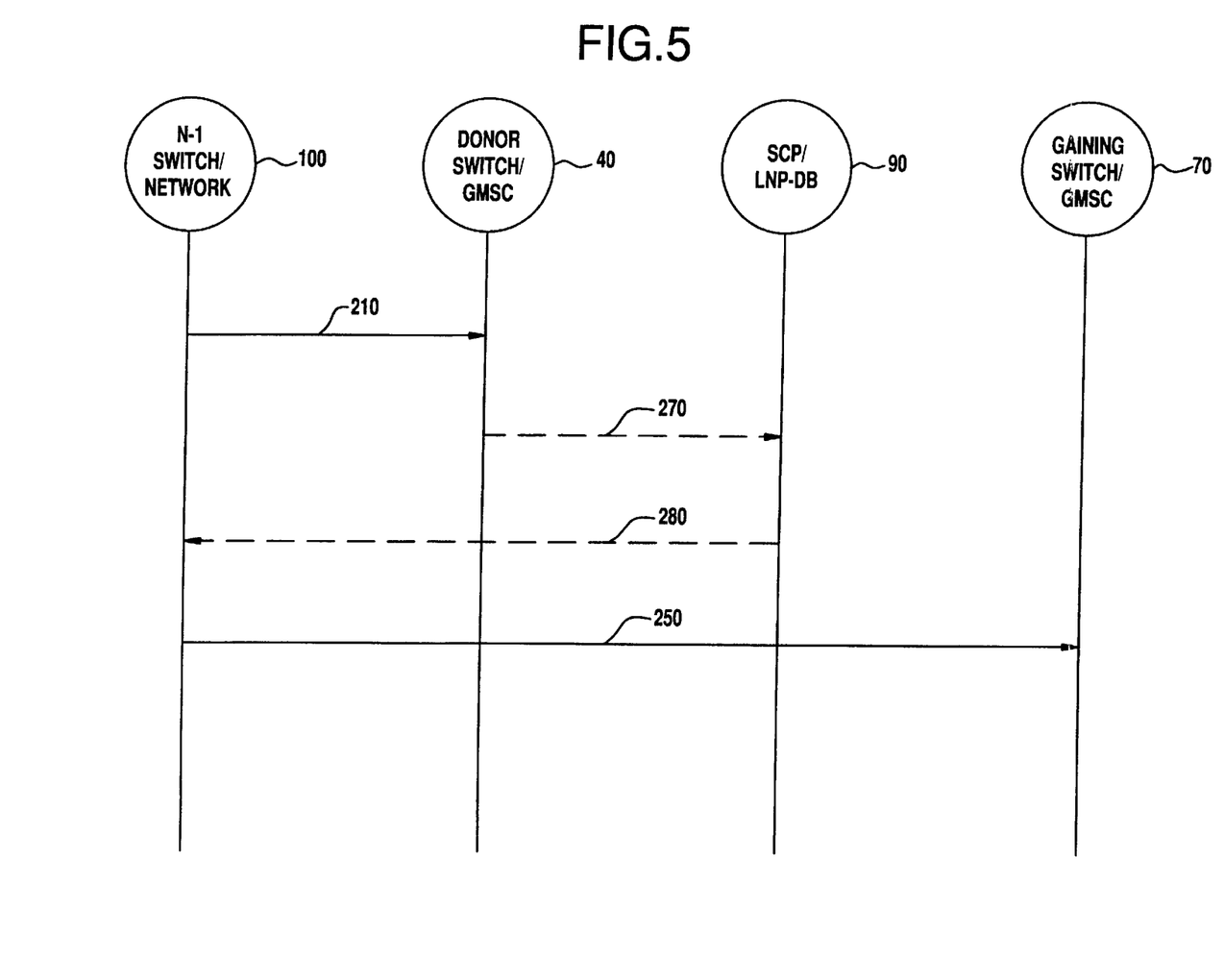
FIG. 5 is a signal sequence chart illustrating the routing of an incoming call to a ported wireline subscriber terminal.

Reference is now made to both FIGS. 4 and 5 illustrating the routing of an incoming call to a ported wireline subscriber terminal 20 in accordance with the teachings of the present invention. The wireline subscriber terminal 20 has been ported from the donor local switch 40 to the gaining local switch 70. Accordingly, the register 260 within the centralized database 90 stores a network address representing the gaining local switch 70.

The calling party subscriber terminal 30 requests a call connection with the called party subscriber terminal 20. As described above, a call setup signal, such as an IAM, is received by the N-1 switch 100. If the originating switch (not shown in FIG. 4) connected to the calling party subscriber terminal 30 is query capable, the N-1 switch may be the originating switch. In order to reduce the number of queries to the centralized database 90, the N-1 switch 100 routes the call setup signal 210 directly to the local switch represented by the received directory number not knowing that the wireline terminal 20 associated with the dialed directory number has already been ported to the gaining local switch 70. Optional parameters within the transmitted IAM signal further include a second network address representing the N-1 switch 100 and a call identifier representing the incoming call setup signal. As a result, the donor local switch 40 receives the call setup signal and determines that the specified called party directory number has been ported. As described above, the donor local switch 40 can determine that the directory number has been ported by ascertaining that no line connection is assigned to the specified directory number. Furthermore, the register 300 may further store data indicating that the dialed directory number has been ported. In response to such a determination, the donor local switch 40 transmits a connection-less signal, such as a SCCP based signal 270, with the directory number assigned to the ported wireline subscriber terminal 20 to the centralized database 90. The transmitted connection-less signal 270 further includes the second network address representing the N-1 switch 100 and the call identifier representing the incoming call connection. The centralized database 90 then retrieves the network address representing the gaining local switch 70 to which the wireline subscriber terminal 20 has been ported. Utilizing the received second network address as the destination address, a signal 280 including the retrieved network address representing the gaining local switch 70 is transmitted to the N-1 switch 100. The transmitted signal 280 further contains the call identifier received from the donor local switch 40.

Upon receiving the signal 280 from the centralized database 90, the N-1 switch 100 realizes that the number has been ported, determines the incoming call connection specified by the included call identifier, and releases the call connection 210 established by the first call setup signal to the donor local switch 40. In a conventional manner, the N-1 switch 100 transmits a new call setup signal 250 to the gaining local switch 70 represented by the received network address. As described above, the originally dialed directory number is further included in the GAP. Accordingly, a call connection between the calling party subscriber terminal 30 and the ported called party wireline subscriber terminal 20 is established.

Figure 6:
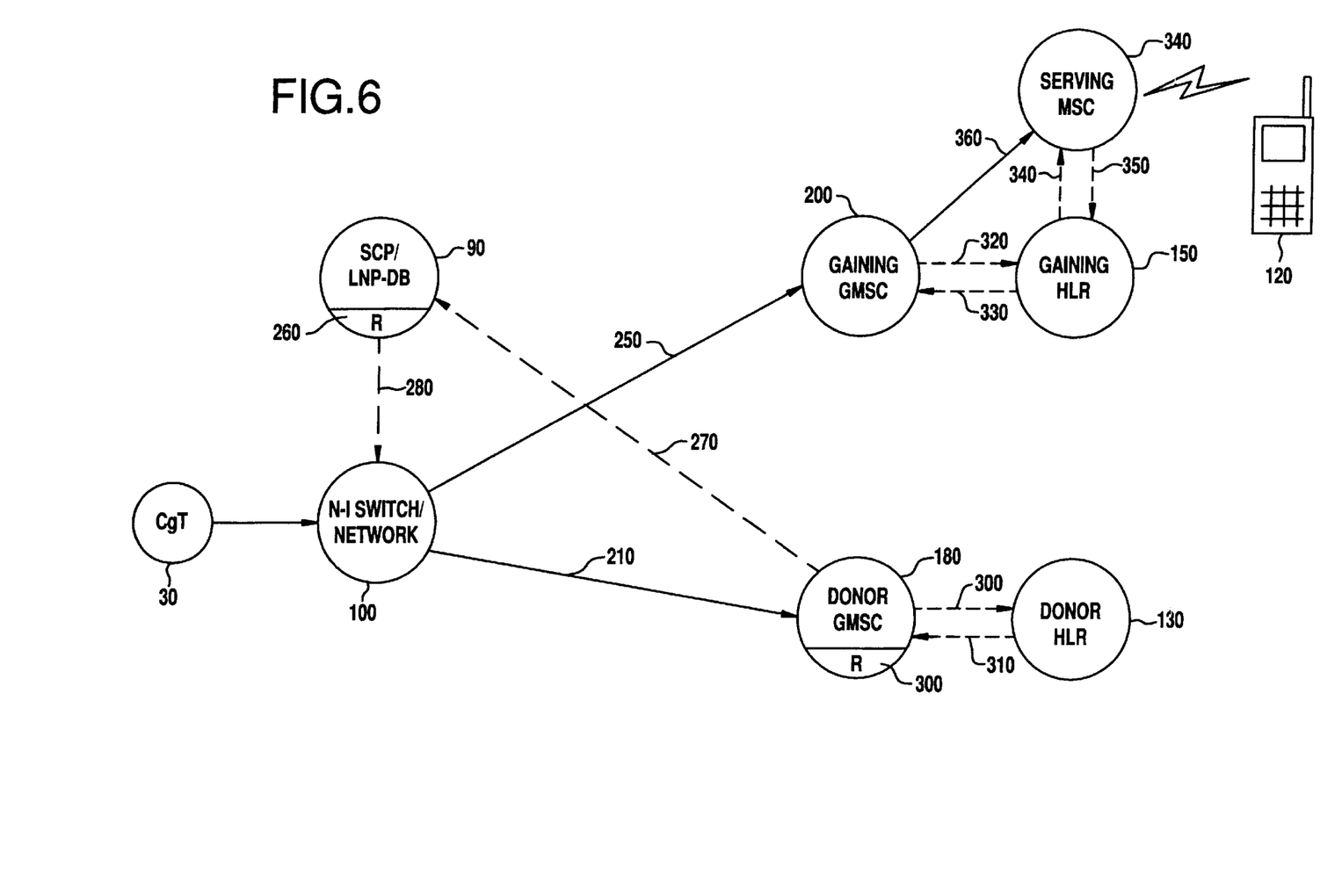
FIG. 6 is a block diagram of a telecommunications network illustrating the routing of an incoming call to a ported mobile station in accordance with the teachings of the present invention.

FIG. 6 is a block diagram of a telecommunications network illustrating the routing of an incoming call to a ported mobile station in accordance with the teachings of the present invention. Calling party subscriber terminal 30 (e.g., wireline subscriber terminal and mobile station) requests a call connection towards the called party mobile station 120 that has been ported from the donor HLR 130 to the gaining HLR 150. In a conventional manner, a call setup signal is routed to the N-1 switch 100 connecting the originating switch (not shown in FIG. 6) with the donor PLMN. Not knowing that the mobile station 120 has been ported, and without yet performing a database query to the centralized database 90, the received incoming call connection is routed to the donor GMSC 180 associated with the donor HLR 130 (signal and call connection 210). The transmitted call setup signal, such as an IAM, further includes a second network address representing the N-1 switch 100 and a call identifier representing the received incoming call connection within its optional parameters. Such optional parameters include a Generic Address Parameter (GAP). The donor GMSC 180, in turn, determines that the mobile station associated with the received MSISDN number has been ported. Such a determination may be made by evaluating a register 300 within the donor GMSC 180 storing data indicating that the MSISDN has been ported. As an alterative, the donor GMSC 180 sends a conventional signal 300 requesting routing instruction to the donor HLR 130 represented by the received MSISDN number. The donor HLR 130 then determines that the MSISDN number is no longer registered and returns a signal 310 informing the donor GMSC 180 that no routing instruction is available and that the mobile station 120 has been ported. In response to such a signal, the donor GMSC 180 transmits another connection-less signal 270, such as a SCCP based signal, with the second network address representing the N-1 switch 100 and the call identifier representing the incoming call connection to the centralized database 90. The centralized database 90 then retrieves the network address representing the gaining GMSC 200, and more particularly the gaining HLR 150, from the register 260. Another connection-less signal 280 including the retrieved network address is transmitted to the N-1 switch 100 utilizing the second network address received from the donor GMSC 180 as the new destination address. The transmitted signal 280 further includes the call identifier representing the incoming call connection.

Upon receiving the signal 280, the N-1 switch 100 determines that the called party mobile station 120 has been ported and, accordingly, releases the first call connection 210 with the donor GMSC 180. Thereinafter, the N-1 switch 100 reroutes the call connection to the gaining GMSC 200 utilizing the received network address as the new CdPn. The MSISDN number associated with the ported mobile station 120 is further included in the GAP in a conventional manner. After receiving the newly transmitted call setup signal, such as an IAM, by the gaining GMSC 200, the gaining GMSC 200 determines the gaining HLR currently serving the ported mobile station 120 by further analyzing the received network address. In response to such a determination, the gaining GMSC 200 sends a Mobile Application Part (MAP) based signal 320 to the gaining HLR 150 requesting routing instructions. The MAP based signal 320 further includes the MSISDN number associated with the ported mobile station. The gaining HLR 150 identifies the mobile station 120 traveling within its coverage area, determines the mobile switching center 340 (MSC) currently provide mobile service to the ported mobile station 120, and transmits another MAP based signal 340 requesting a roaming number to the determined MSC 340. The MSC 340, in turn, returns the roaming number representing the serving MSC 340, to the gaining HLR via signal 340. The gaining HLR 150 then forwards the received roaming number to the gaining GMSC 200 via signal 330. In a conventional manner, utilizing the received roaming number as the destination address, the gaining GMSC 200 reroutes the received incoming call connection to the serving MSC 340. The serving MSC 340 then pages the ported mobile station 120 and establishes a call connection between the calling party subscriber terminal 30 and the ported mobile station 120. As a result, call connections to ported telecommunications terminals are established while performing centralized database queries only for the ported telecommunications terminals.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for routing an incoming call from a first telecommunications node to a ported telecommunications terminal, said method comprising the steps of:

receiving an incoming call at said first telecommunications node towards said telecommunications terminal associated with a particular directory number;

routing a first call setup signal from said first telecommunications node to a second telecommunications node indicated by said directory number, said ported telecommunications terminal used to be associated with said second telecommunications node;

receiving a signal from a centralized database, in response to said first call setup signal, that said telecommunications terminal has been ported, said signal further including a network address representing a third telecommunications node now associated with the ported telecommunications terminal; and routing a second call setup signal from said first telecommunications node to said third telecommunications node indicated by said received network address.

2. The method of claim 1 wherein said first call setup signal further comprises a second network address representing said first telecommunications node and a call identifier representing said received incoming call.

3. The method of claim 1 wherein said third telecommunications node is a wireline local exchange.

4. The method of claim 1 wherein said third telecommunications node is a home location register.

5. A system for routing an incoming call from a first telecommunications node to a ported telecommunications terminal, said ported telecommunications terminal used to be associated with a second telecommunications node but is now associated with a third telecommunications node, wherein said second telecommunications node is further associated with a centralized database for storing a network address representing said third telecommunications node, said first telecommunications node comprising:

means for receiving an incoming call towards said telecommunications terminal associated with a particular directory number;

means for routing a first call setup signal towards said second telecommunications node as indicated by said directory number;

means for receiving a signal from said centralized database, in response to said first call setup signal, that said telecommunications terminal has been ported, said signal further including said network address representing said third telecommunications node associated with the ported telecommunications terminal; and means for routing a second call setup signal towards said third telecommunications node using said received network address.

6. The system of claim 5 wherein said first call setup signal further comprises a second network address representing said first telecommunications node and a call identifier representing said received incoming call.

7. The system of claim 5 wherein said third telecommunications node is a wireline local exchange.

8. The system of claim 5 wherein said third telecommunications node is a home location register.

\* \* \* \* \*